US 6,732,965 B2

(12) United States Patent
Bascue, Jr.

(10) Patent No.: US 6,732,965 B2
(45) Date of Patent: May 11, 2004

(54) FLY FISHING REEL WITH A DEVICE FOR ENABLING OR DISABLING A PRESET AMOUNT OF DRAG (76) Inventor: Clyde H. Bascue, Jr., 977 Inman Rd., Niskayuna, NY (US) 12309

( * ) Notice: Subject to any disclaimer, the term of this patent is extended or adjusted under 35 U.S.C. 154(b) by 9 days.

(21) Appl. No.: 10/068,223

(22) Filed: Feb. 7, 2002

(65) Prior Publication Data
US 2002/0104912 A1 Aug. 8, 2002

Related U.S. Application Data
(60) Provisional application No. 60/267,268, filed on Feb. 8, 2001.

(51) Int. Cl.[7] .............................................. A01K 89/02
(52) U.S. Cl. ....................... 242/304; 242/303; 242/291; 242/292; 242/294
(58) Field of Search ................. 242/317, 303, 242/304, 291, 292, 294

(56) References Cited

U.S. PATENT DOCUMENTS

| 1,168,307 | A | * | 1/1916 | Johnson | 242/316 |
| 1,353,113 | A | * | 9/1920 | Deets | 242/291 |
| 1,832,421 | A | * | 11/1931 | Pflueger et al. | 242/292 |
| 2,725,201 | A | * | 11/1955 | Miller | 242/294 |
| 3,315,913 | A | * | 4/1967 | Grieten | 242/271 |
| 3,425,644 | A | * | 2/1969 | Griste | 242/270 |
| 3,446,453 | A | * | 5/1969 | Pachner | 242/256 |
| 3,968,943 | A | | 7/1976 | Murvall | |
| 4,056,246 | A | * | 11/1977 | Purcell | 242/270 |
| 4,657,201 | A | * | 4/1987 | Munroe | 242/265 |
| 4,986,492 | A | * | 1/1991 | Wulff | 242/294 |
| 5,037,039 | A | | 8/1991 | Toda | |
| 5,267,707 | A | | 12/1993 | Oliva | |
| 5,393,004 | A | | 2/1995 | Weaver et al. | |
| 5,427,325 | A | | 6/1995 | Weaver | |
| 5,692,691 | A | * | 12/1997 | Fujigiwa | 242/239 |
| 5,788,172 | A | | 8/1998 | Rosa et al. | |
| 5,865,388 | A | * | 2/1999 | Yeh | 242/292 |
| 5,915,639 | A | | 6/1999 | Farris | |
| 5,921,492 | A | | 7/1999 | Bauer | |
| 5,988,547 | A | | 11/1999 | Koelewyn | |
| 6,019,301 | A | | 2/2000 | Hitomi | |
| 6,045,073 | A | | 4/2000 | Ikuta | |
| 6,053,445 | A | | 4/2000 | Farris | |
| 6,073,871 | A | | 6/2000 | Farris et al. | |
| 6,152,390 | A | * | 11/2000 | Datcuk, Jr. | 242/270 |
| 6,164,576 | A | | 12/2000 | Takahashi | |
| 6,168,107 | B1 | | 1/2001 | Bishop et al. | |
| 6,402,073 | B1 | * | 6/2002 | Datcuk, Jr. | 242/270 |

* cited by examiner

Primary Examiner—Kathy Matecki
Assistant Examiner—Evan H Langdon
(74) Attorney, Agent, or Firm—Schmeiser, Olsen & Watts (57) ABSTRACT A method and structure for forming a fly fishing reel having a device to engage or release a preset amount of drag from a spool of line. A spool of line is mounted on a spindle on the fly fishing reel. A drag mechanism is adapted to apply resistance against rotation of the spool. The device is adapted to engage or release the drag mechanism from the spool so that the preset amount of drag is enabled or disabled.

48 Claims, 7 Drawing Sheets

FLY FISHING REEL WITH A DEVICE FOR ENABLING OR DISABLING A PRESET AMOUNT OF DRAG

RELATED APPLICATION

The present invention claims priority to U.S. Provisional Patent Application No. 60/267,268, filed on Feb. 8, 2001, which is entirely incorporated herein by reference.

BACKGROUND OF THE INVENTION

1. Technical Field

The present invention relates to an apparatus and associated method to engage or release a pre-set drag on a fly-fishing reel.

2. Related Art

Stripping line from a fly-fishing reel requires a user to pull against a preset line resistance (drag). The preset line resistance may make it difficult to strip the line. Thus there is a need to make it easier to strip the line.

SUMMARY OF THE INVENTION

The present invention provides a fly-fishing reel, comprising:
 a spool of line on a spindle of the fly-fishing reel;
 a drag mechanism, wherein the drag mechanism is adapted to apply a preset resistance against rotation of the spool; and
 a device, wherein the device is adapted to release the drag mechanism from the spool such that the preset resistance is disabled.

The present invention provides a fly-fishing reel, comprising:
 a spool of line on a spindle of the fly-fishing reel;
 a drag mechanism, wherein the drag mechanism is adapted to apply a preset resistance against rotation of the spool; and
 a device, wherein the device is adapted to engage the drag mechanism to the spool such that the preset resistance is enabled.

The present invention provides a method for forming a fly-fishing reel, comprising:
 providing a spool of line on a spindle of the fly-fishing reel;
 providing a drag mechanism, wherein the drag mechanism is adapted to apply a preset resistance against rotation of the spool; and
 providing a device, wherein the device is adapted to release the drag mechanism from the spool such that the preset resistance is disabled.

The present invention provides a method for forming a fly-fishing reel, comprising:
 providing a spool of line on a spindle of the fly-fishing reel;
 providing a drag mechanism, wherein the drag mechanism is adapted to apply a preset resistance against rotation of the spool; and
 providing a device, wherein the device is adapted to engage the drag mechanism to the spool such that the preset resistance is enabled.

A fly-fishing reel, comprising:
 a spool of line on a spindle of the fly-fishing reel;
 a drag mechanism, wherein the drag mechanism is adapted to apply a preset resistance against rotation of the spool; and
 means for releasing the drag mechanism from the spool such that the preset resistance is disabled.

A fly-fishing reel, comprising:
 a spool of line on a spindle of the fly-fishing reel;
 a drag mechanism, wherein the drag mechanism is adapted to apply a preset resistance against rotation of the spool; and
 means for engaging the drag mechanism to the spool such that the preset resistance is enabled.

The present invention advantageously disengages the preset drag from a fly fishing reel, resulting in little resistance when stripping line from the fly fishing reel.

DETAILED DESCRIPTION OF THE INVENTION

Figure 1:
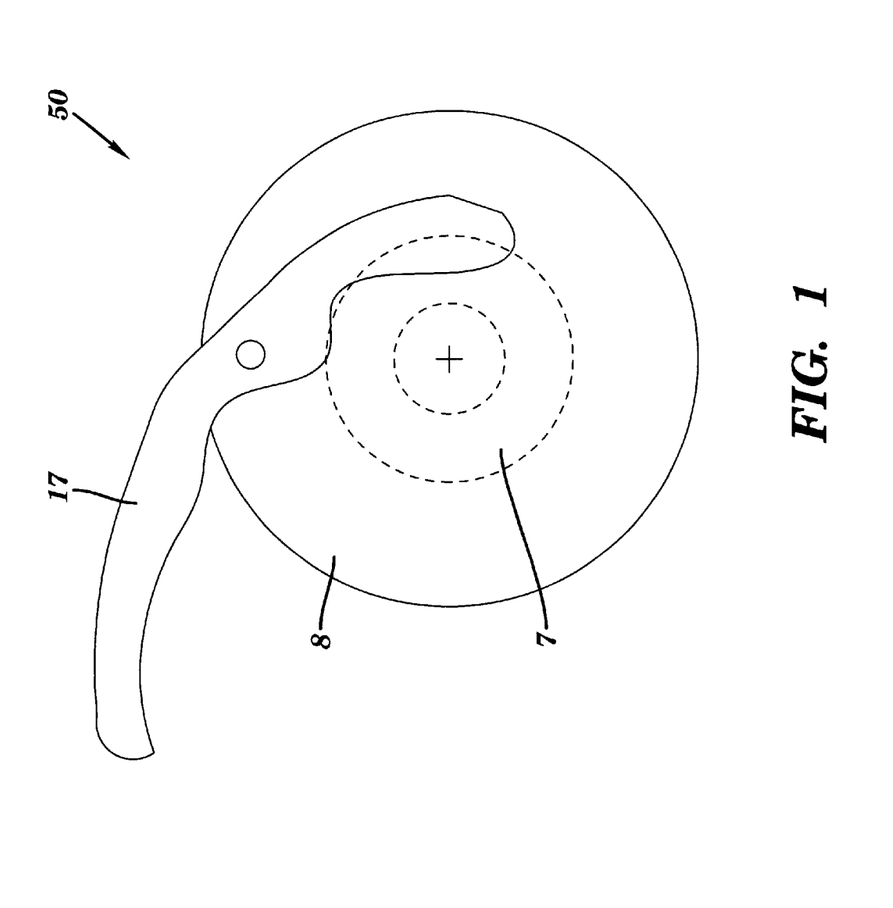
FIG. 1 depicts a first cross-sectional view of a fly fishing reel, including a one piece device, in accordance with embodiments of the present invention.
Figure 5:
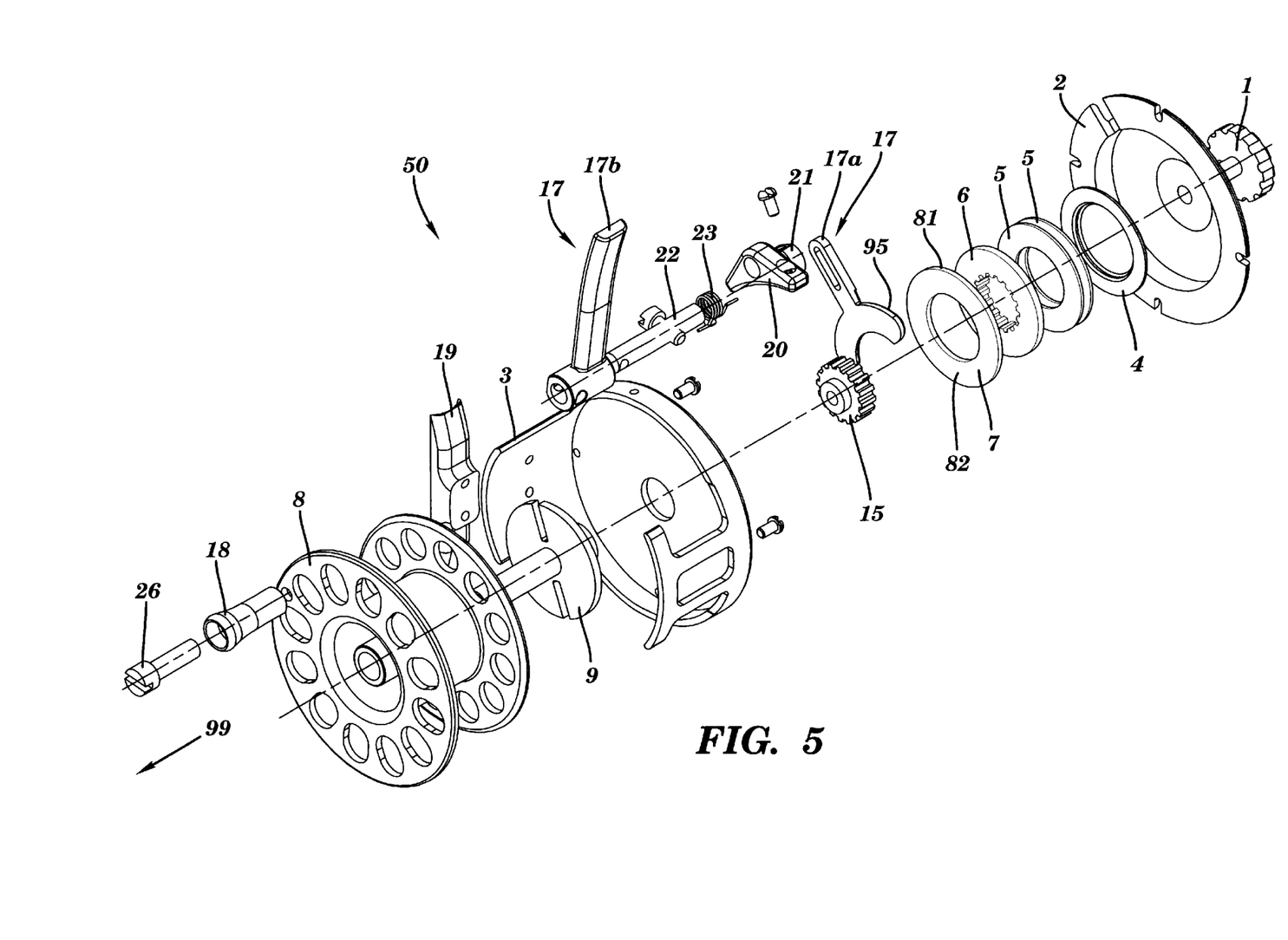
FIG. 5 depicts a three dimensional exploded view of the fly fishing reel of FIG. 4, in accordance with embodiments of the present invention.
Figure 6:
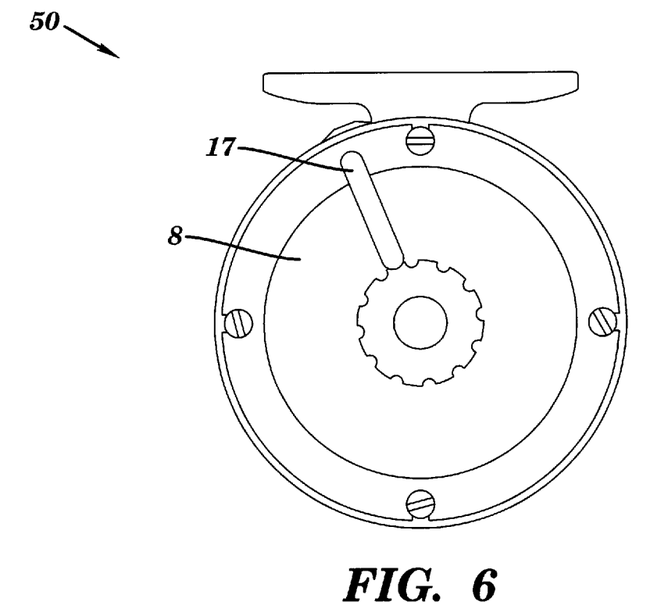
FIG. 6 depicts a side view of a fly fishing reel, illustrating a lever, in accordance with embodiments of the present invention.

FIG. 1 illustrates a first cross sectional view of a fly fishing reel 50 having a device 17 to engage or release a preset amount of drag (may also be described as "resistance") from a spool 8 by engaging a taper drag disc 7, in accordance with embodiments of the present invention. The device 17 may comprise one piece (e.g. device 17 in FIG. 1 and 2) or it may comprise a plurality of pieces (e.g., device 17 comprising pieces 17a and 17b in FIGS. 3–5 and 7–9). The device 17 may be a trigger (i.e., as shown in FIGS. 1–5 and 7–9) or a lever (i.e., as shown in FIG. 6). The device 17 may comprise a metallic alloy or metal including, inter alia, stainless steel or aluminum. The spool 8 may comprise metal including, inter alia, aluminum. The taper drag disc 7 may comprise plastic including, inter alia, Rulon®or Nylon®.

Figure 2:
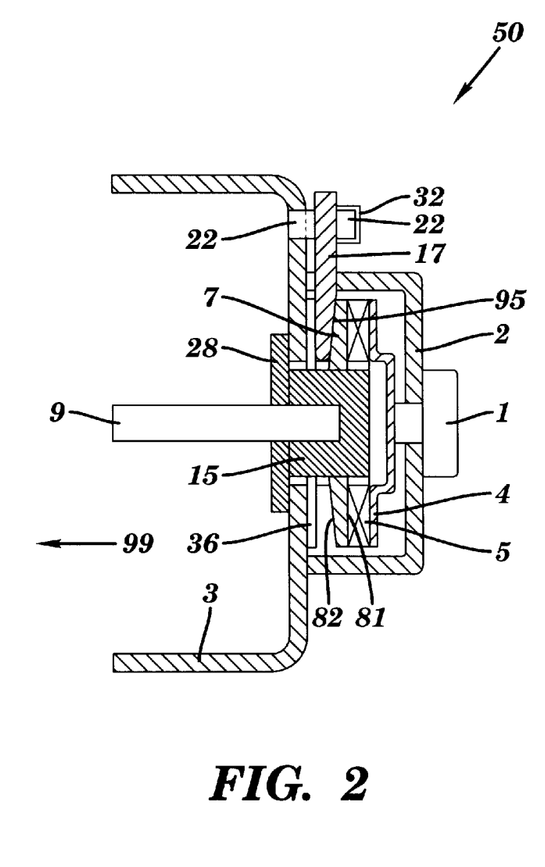
FIG. 2 depicts a second cross-sectional view of the fly fishing reel of FIG. 1, also including the one piece device, in accordance with embodiments of the present invention.
Figure 3:
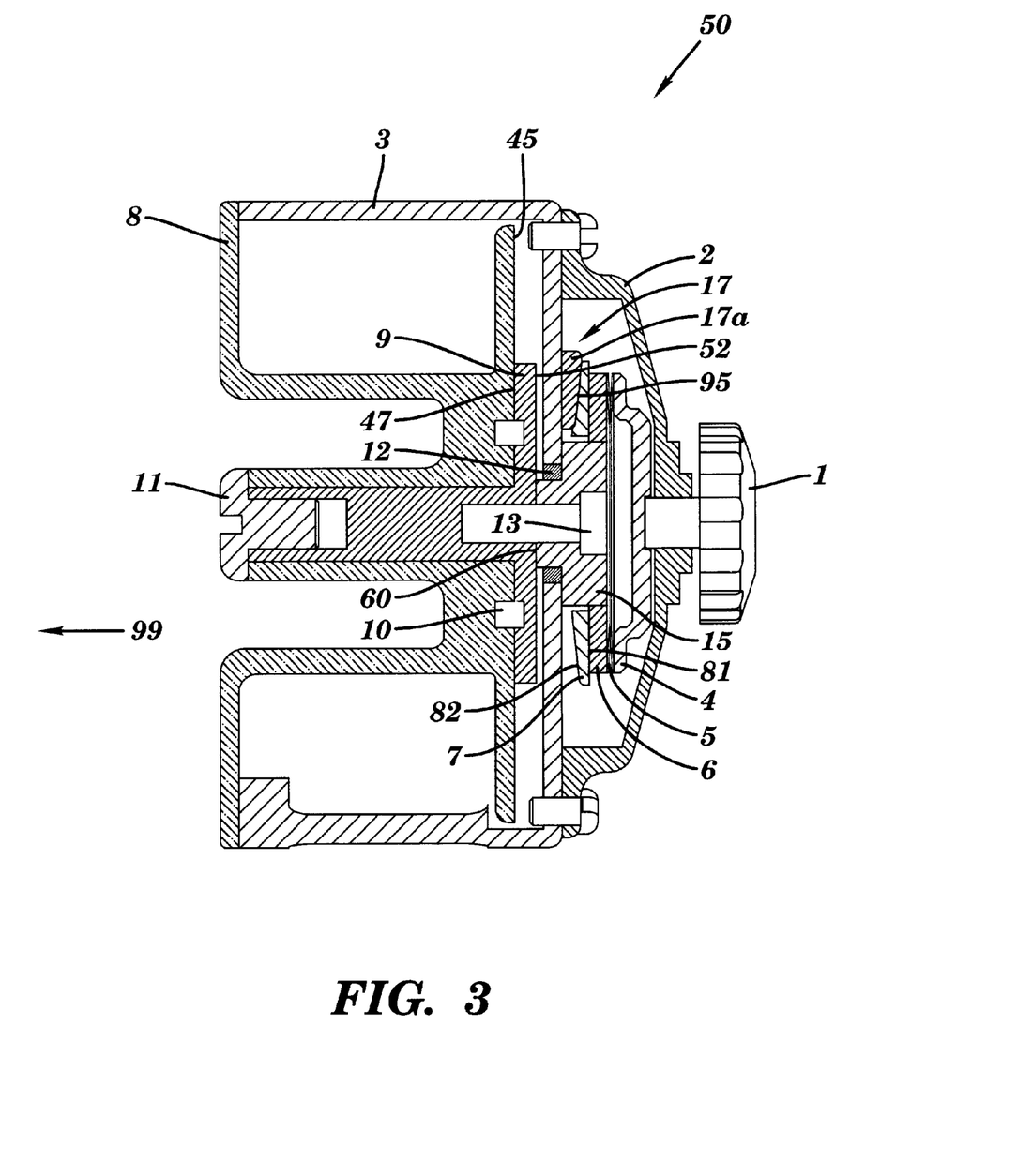
FIG. 3 depicts a modified cross-sectional view of the fly fishing reel in FIG. 2, showing a two piece device, in accordance with embodiments of the present invention.

FIG. 2 illustrates a second cross sectional view of the fly fishing reel 50 of FIG. 1 having the device 17 to engage or release a preset amount of drag from the spool 8 (shown in FIG. 1 but not shown in FIG. 2) by engaging a drag mechanism comprising a drag preset knob 1, a spring compressor 4, a compression spring 5, and a taper drag disc 7, in accordance with embodiments of the present invention. The device 17 may be a trigger (i.e., as shown in FIG. 2) or a lever (i.e., as shown in FIG. 6). The device 17 may comprise one piece or it may comprise a plurality of pieces. The device 17 may include a tapered drag surface 95. The spool 8 is attached to a spool engagement shaft 9 that is attached to a spline hub 15. A keyed engagement disc 28 locks the spool 8 to the spline hub 15 so that the spool 8, the keyed engagement disc 28, and the spline hub 15 may rotate together in a clockwise or counter clockwise direction. The spool 8 may be enclosed within a reel body 3. The device 17 is engaged so that the preset amount of drag may be applied to the spool 8, gradually or instantaneously. The aforementioned drag is adjusted to a preset value by taming the drag preset knob 1 clockwise or counter clockwise into a threaded opening in a drag housing 2, wherein the spring compressor 4 is pushed forward (i.e., in the direction 99). The force of the spring compressor 4 moving forward in the direction 99 compresses the compression spring(s) 5. The compression spring(s) 5 is circular with a clearance hole in the center that fits over (i.e., encloses) the spline hub 15. The compression spring(s) 5 applies a force in the direction 99 to the back of the surface 81 of the taper drag disc 7. The front surface 82 of the taper drag disc 7 is used as a braking surface for the device 17 to engage. As the front surface 82 of the taper drag disc 7 is engaged by the device 17, the taper drag disc 7 is forced backwards (opposite to direction 99) towards the compression spring(s) 5. The friction between the device 17 and the front surface 82 of the taper drag disc 7 thus creates the preset amount of drag. The taper drag disc 7 is a part of the drag mechanism as described supra. The device 17 may be released from the drag mechanism so that the preset amount of drag is disabled and the spool 8 (i.e., as shown in FIG. 3) is free to spin, allowing for the free pulling of line from the fly fishing reel for casting. The device 17 may enable the preset drag after the preset drag is disabled. The device 17 and the drag mechanism may be separate components or as portions of a same component. A torsion spring 23 may be used to return the device 17 to a desired or predetermined position. A locking cap 32 may be used to lock the device 17 in a desired or predetermined position. A washer 36 comprising metal or plastic may be used between the trigger 17 and the reel body 3. The device 17 may comprise a metallic alloy or metal such as, inter alia, stainless steel or aluminum. The spool 8, drag housing 2, and reel body 3 may each comprise a metallic alloy or metal such as, inter alia, aluminum. The taper drag disc 7 may comprise plastic such as, inter alia, Rulon® or Nylon®. The spring compressor 4, compression spring(s) 5, spool engagement shaft 9, spline hub 15, torsion spring 23, engagement disc 28, and locking cap 32 may each comprise a metallic alloy or metal such as, inter alia, stainless steel. The drag preset knob 1 may comprise, inter alia, plastic, metal, or a metallic alloy.

FIG. 3 shows a modified cross sectional view of a fly fishing reel 50 having a two piece device 17 comprising pieces 17a and 17b (see FIG. 4 for piece 17b) to engage or release a preset amount of drag from a spool 8 by engaging a drag mechanism comprising a drag preset knob 1, a spring compressor 4, a compression spring 5, a taper disc backer 6, and a taper drag disc 7, in accordance with embodiments of the present invention. The device 17 may be a trigger (i.e., as shown in FIG. 3) or a lever (i.e., as shown in FIG. 6). The device 17 may comprise one piece (as in FIGS. 1 and 2) or it may comprise a plurality of pieces (e.g. pieces 17a and 17b in FIGS. 3–5 and 7–9). The device 17 may include a tapered drag surface 95. The spool 8 may be enclosed within a reel body 3. The spool 8 is secured to a spool engagement shaft 9 using a spool attachment screw 11. The spool engagement shaft 9 is attached to a spline hub 15. A side 45 of the spool 8 and a side 47 of the spool engagement shaft 9 have cutouts to accept spool keys 10. The spool keys 10 lock the side 45 of the spool 8 to the side 47 of the spool engagement shaft 9 to allow for positive engagement while turning the reel 8. A side 52 of the spool engagement shaft 9 is coupled to a side 60 of a spline hub 15 and is secured in place using a hub attachment screw 13. A bearing 12 may be used around the spline hub 15 where the spline hub 15 protrudes thru a reel body 3. The device 17 is engaged so that the preset amount of drag may be applied to the reel 8, gradually or instantaneously. The aforementioned drag is adjusted to a preset value by turning the drag preset knob 1 clockwise or counter clockwise into a threaded opening in a drag housing 2, wherein the spring compressor 4 is pushed forward (i.e., in a direction 99). The force of the spring compressor 4 moving forward in the direction 99 compresses the compression spring(s) 5. The compression spring(s) 5 is circular with a clearance hole in the center that fits over (i.e., encloses) the spline hub 15. The compression spring(s) 5 applies a force to the taper disc backer 6 that is adhesively coupled to a back surface 81 of the taper drag disc 7. A front surface 82 of the taper drag disc 7 is used as a braking surface for the device 17 to engage. As the front surface 82 of the taper drag disc 7 is engaged by the device 17, the taper drag disc 7 is forced backwards (opposite to direction 99) towards the compression spring(s) 5. The friction between the device 17 and the front surface 82 of the taper drag disc 7 thus creates the preset amount of drag. The taper drag disc 7 is part of the drag mechanism as described supra. The device 17 may be released from the drag mechanism so that the preset amount of drag is disabled and the spool 8 is free to spin, allowing for the free pulling of line from the fly fishing reel for casting. The device 17 may enable the preset drag after the preset drag is disabled. The device 17 and the drag mechanism may be separate components or as portions of a same component. The device 17 may comprise a metallic alloy or metal such as, inter alia, stainless steel or aluminum. The spool 8, drag housing 2, and reel body 3 may comprise a metallic alloy or metal such as, inter alia, aluminum. The taper drag disc 7 may comprise plastic such as, inter alia, Rulon® or Nylon®. The bearing 12 may comprise metal such as, inter alia, stainless steel or plastic including, inter alia, Rulan®. The spring compressor 4, compression spring(s) 5, taper disc backer 6, spool engagement shaft 9, spool key 10, spool attachment screw 11, hub attachment screw 13, and spline hub 15 may each comprise a metallic alloy or metal such as, inter alia, stainless steel. The drag preset knob 1 may comprise, inter alia, plastic or metal.

Figure 4:
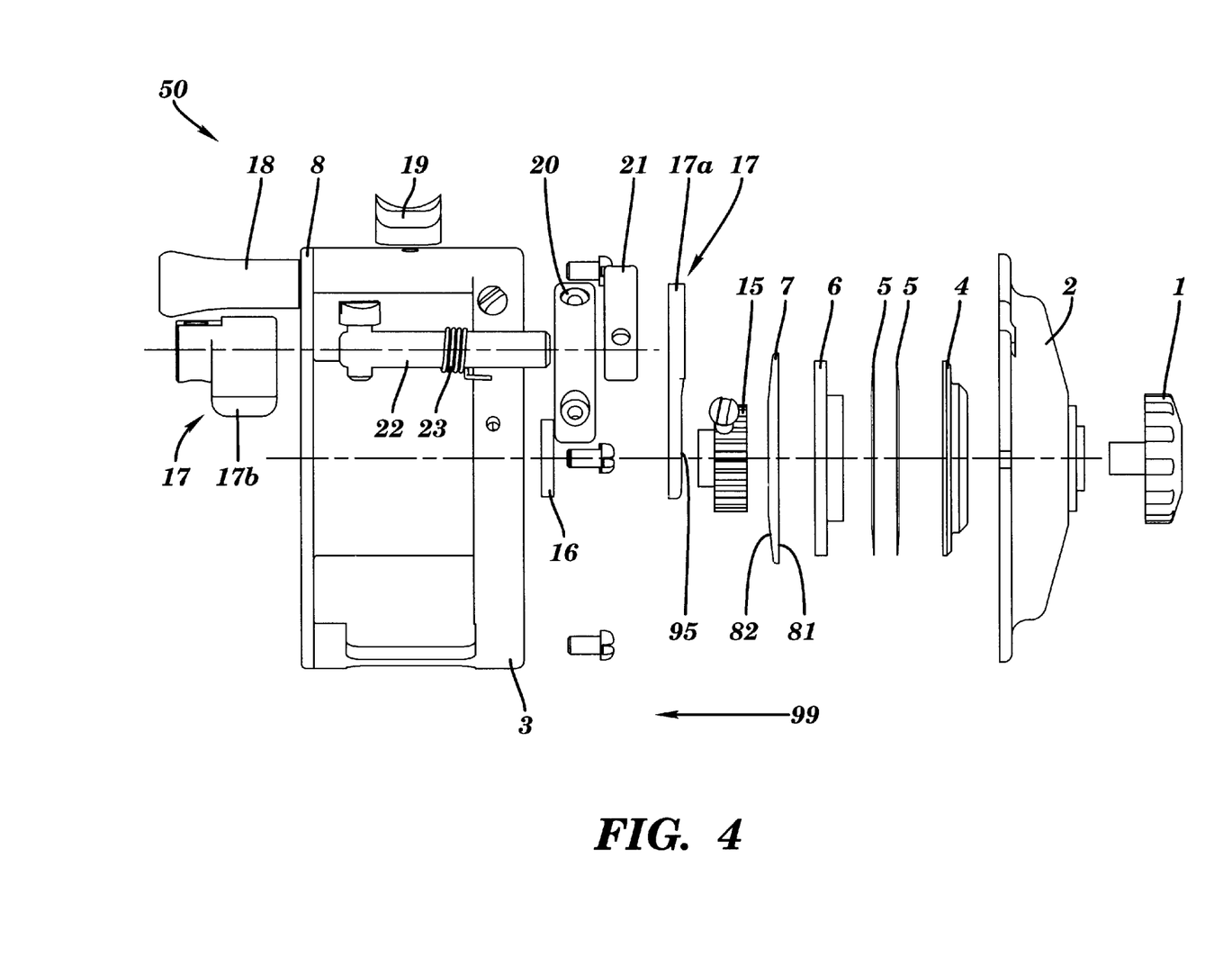
FIG. 4 depicts an exploded side view of the fly fishing reel of FIG. 3, in accordance with embodiments of the present invention.
Figure 7:
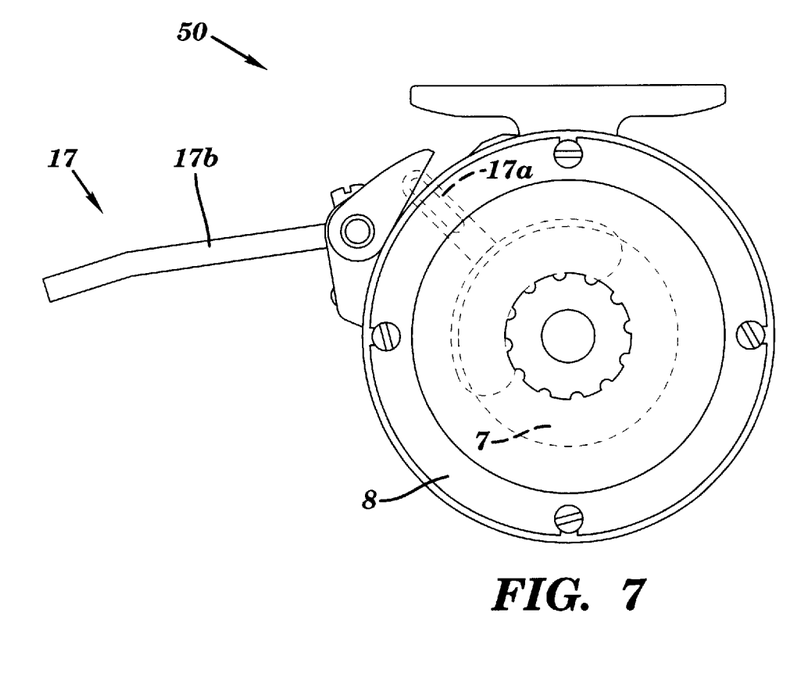
FIG. 7 depicts a side view of the fly fishing reel of FIG. 5, illustrating a two piece trigger, in accordance with embodiments of the present invention.

FIG. 4 illustrates an exploded side view of FIG. 3, showing the fly fishing reel 50 having a device 17 (The device 17 is used to represent the combination of a trigger 17a and 17b) to engage or release a preset amount of drag from a spool 8 by engaging a drag mechanism comprising a drag preset knob 1, a spring compressor 4, a compression spring 5, a taper disc backer 6, and a taper drag disc 7, in accordance with embodiments of the present invention. The device 17 may comprise one piece (as shown in FIGS. 1 and 2) or a plurality of pieces (as shown in FIGS. 3–5 and FIGS. 7–9). The device may be the trigger 17a and 17b (i.e., as shown in FIG. 4,5, and 7) or a lever 17 (i.e., as shown in FIG. 6). The device 17 may include a tapered drag surface 95. The spool 8 may be enclosed within a reel body 3. The reel body is mounted to a fishing pole using a reel foot 19. The spool 8 is attached to a spool engagement shaft 9 (see FIG. 3) and the spool engagement shaft is 9 is coupled to a spline hub 15 and is secured in place using a hub attachment screw 13 (i.e., as shown in FIG. 3). A bushing 16 may be used to separate the spool engagement shaft 9 from the reel body 3 acting as a bearing. The device 17a, 17b is engaged so that a preset amount of drag may be applied to the reel 8, gradually or instantaneously. The aforementioned drag is adjusted to a preset value by turning the drag preset knob 1 clockwise or counter clockwise into a threaded opening in a drag housing 2, wherein the spring compressor 4 is pushed forward (i.e., in a direction 99). The force of the spring compressor 4 moving forward in the direction 99 compresses a compression spring(s) 5. The compression spring(s) 5 is circular with a clearance hole in the center that fits over the spline hub 15. The compression spring(s) 5 applies a force to taper disc backer 6 that is adhesively coupled to a back surface 81 of the taper drag disc 7. A front surface 82 of the taper drag disc 7 is used as a braking surface for the device 17a to engage. As the front surface 82 of the taper drag disc 7 is engaged by the device 17a, the taper drag disc 7 is forced backwards (opposite to direction 99) towards the compression spring(s) 5. The friction between the device 17a and the front surface 82 of the taper drag disc 7 thus creates the preset amount of drag. The taper drag disc 7 is part of the drag mechanism as described supra. The device 17 may be released from the drag mechanism so that the preset amount of drag is disabled and the spool 8 is free to spin, allowing for the free pulling of line from the fly fishing reel for casting. The device 17 may enable the preset drag after the preset drag is disabled. The device 17 and the drag mechanism may be separate components or as portions of a same component. The device 17 may include a torsion spring 23 used to return the device 17 to a desired or predetermined position. FIG. 4 illustrates a two piece device 17a,b attached to a shaft 22, wherein the shaft 22 may rotate thru a device pivot 20 that is attached to the reel body 3. A device compressor 21 forces the device 17a to engage the taper drag disc 7. A handle 18 is used to rotate the spool 8 for line retrieval. The device 17 and device pivot 20 may comprise a metallic alloy or metal such as, inter alia, stainless steel or aluminum. The spool 8, drag housing 2, reel foot 19 and reel body 3 may comprise a metallic alloy or metal such as, inter alia, aluminum. The taper drag disc 7 may comprise plastic such as, inter alia, Rulon® or Nylon®. The spring compressor 4, compression spring(s) 5, taper disc backer 6, spool engagement shaft 9, spline hub 15, compressor 21, torsion spring 23, and shaft 22 may comprise a metallic alloy or metal such as, inter alia, stainless steel. The drag preset knob 1, bushing 16, and handle 18 may comprise, inter alia, plastic or metal.

FIG. 5 illustrates a 3 dimensional exploded view of FIG. 4, showing of a fly fishing reel 50 having a device 17 (The device 17 is used to represent the combination of a trigger 17a and 17b) to engage or release a preset amount of drag from a spool 8 by engaging a drag mechanism comprising a drag preset knob 1, a spring compressor 4, a compression spring 5, a taper disc backer 6, and a taper drag disc 7, in accordance with embodiments of the present invention. The device 17 may be a trigger 17a and 17b (i.e., as shown in FIG. 5) or a lever 17 (i.e., as shown in FIG. 6). The spool 8 may be enclosed within a reel body 3. The reel body 3 is mounted to a fishing pole using a reel foot 19. The spool 8 is attached to a spool engagement shaft 9 and the spool engagement shaft is 9 is coupled to a spline hub 15 and is secured in place using a hub attachment screw 13 (i.e., as shown in FIG. 3). The device 17a, 17b is engaged so that a preset amount of drag may be applied to the reel 8, gradually or instantaneously. The aforementioned drag is adjusted to a preset value by turning the drag preset knob 1 clockwise or counter clockwise into a threaded opening in a drag housing 2, wherein the spring compressor 4 is pushed forward in a direction 99. The force of the spring compressor 4 moving forward in the direction 99 compresses the compression spring(s) 5. The compression spring(s) 5 is circular with a clearance hole in the center that fits over (i.e., encloses) the spline hub 15. The compression spring(s) 5 applies a force to the taper disc backer 6 that is adhesively coupled to a back surface 81 of the taper drag disc 7. The front surface 82 of the taper drag disc 7 is used as a braking surface for the device 17a to engage. As the taper drag disc 7 is engaged by the device 17a, the taper drag disc 7 is forced backwards (opposite to direction 99) towards the compression spring(s) 5. The friction between the device 17a and the front surface 82 of the taper drag disc 7 thus creates the preset amount of drag. The taper drag disc 7 is part of the drag mechanism as described supra. The device 17 may be released from the drag mechanism so that the preset amount of drag is disabled and the spool 8 is free to spin, allowing for the free pulling of line from the fly fishing reel for casting. The device 17 may enable the preset drag after the preset drag is disabled. The device 17 and the drag mechanism may be separate components or as portions of a same component. The device 17 may comprise one piece or it may comprise a plurality of pieces and a torsion spring 23 may be used to return the device 17 to a desired or predetermined position. FIG. 5 illustrates a two piece device 17a,b attached to a shaft 22, wherein the shaft 22 may rotate thru a device pivot 20 that is attached to the reel body 3. A device compressor 21 forces the device 17a to engage the taper drag disc 7. A handle 18, attached to the spool 8 with a screw 26 may be used to rotate the spool 8 for line retrieval. The device 17 and device pivot 20 may comprise a metallic alloy or metal such as, inter alia, stainless steel or aluminum. The spool 8, drag housing 2, reel foot 19 and reel body 3 may each comprise a metallic alloy or metal such as, inter alia, aluminum. The taper drag disc 7 may comprise plastic including, inter alia, Rulon® or Nylon®. The spring compressor 4, compression spring(s) 5, taper disc backer 6, spool engagement shaft 9, spline hub 15, compressor 21, torsion spring 23, screw 26, and shaft 22 may each comprise a metallic alloy or metal such as, inter alia, stainless steel. The drag preset knob 1 and handle 18 may comprise, inter alia, plastic or metal.

FIG. 6 illustrates a side view of a fly fishing reel 50 having a device 17 to engage or release a preset amount of drag from a spool 8, by engaging a drag mechanism comprising a drag preset knob 1, a spring compressor 4, a compression spring 5, a taper disc backer 6, and a taper drag disc 7 (as shown in FIG. 2–FIG. 5), in accordance with embodiments of the present invention. The device 17 illustrated in FIG. 6 is a lever. The device 17 may comprise one piece or a plurality of pieces. The device 17 may be engaged so that a preset amount of drag may be applied to the reel 8, gradually or instantaneously. The device 17 may be released from the from the drag mechanism so the preset amount of drag is disabled. The device 17 may enable the preset amount of drag after the preset amount of drag is disabled. The device 17 and the drag mechanism may be separate components or as portions of a same component. The device 17 may each comprise a metallic alloy or metal such as, inter alia, stainless steel or aluminum. The spool 8 may comprise metal including, inter alia, aluminum.

FIG. 7 illustrates a side view of the fly fishing reel 50 of FIG. 5 having a device 17 to engage or release a preset amount of drag from a spool 8 by engaging a drag mechanism comprising a drag preset knob 1, a spring compressor 4, a compression spring 5, a taper disc backer 6, and a taper drag disc 7 (as shown in FIG. 2–FIG. 5), in accordance with embodiments of the present invention. The device 17 illustrated in FIG. 7 is a trigger 17a,b having a plurality of pieces. The device 17 may be engaged so that a preset amount of drag may be applied to the reel 8, gradually or instantaneously. The device 17 may be released from the from the drag mechanism so the preset amount of drag is disabled. The device 17 may enable the preset amount of drag after the preset amount of drag is disabled. The device 17 and the drag mechanism may be separate components or as portions of a same component. The device 17 may comprise metal including, inter alia, stainless steel or aluminum. The spool 8 may comprise metal including, inter alia, aluminum.

Figure 8:
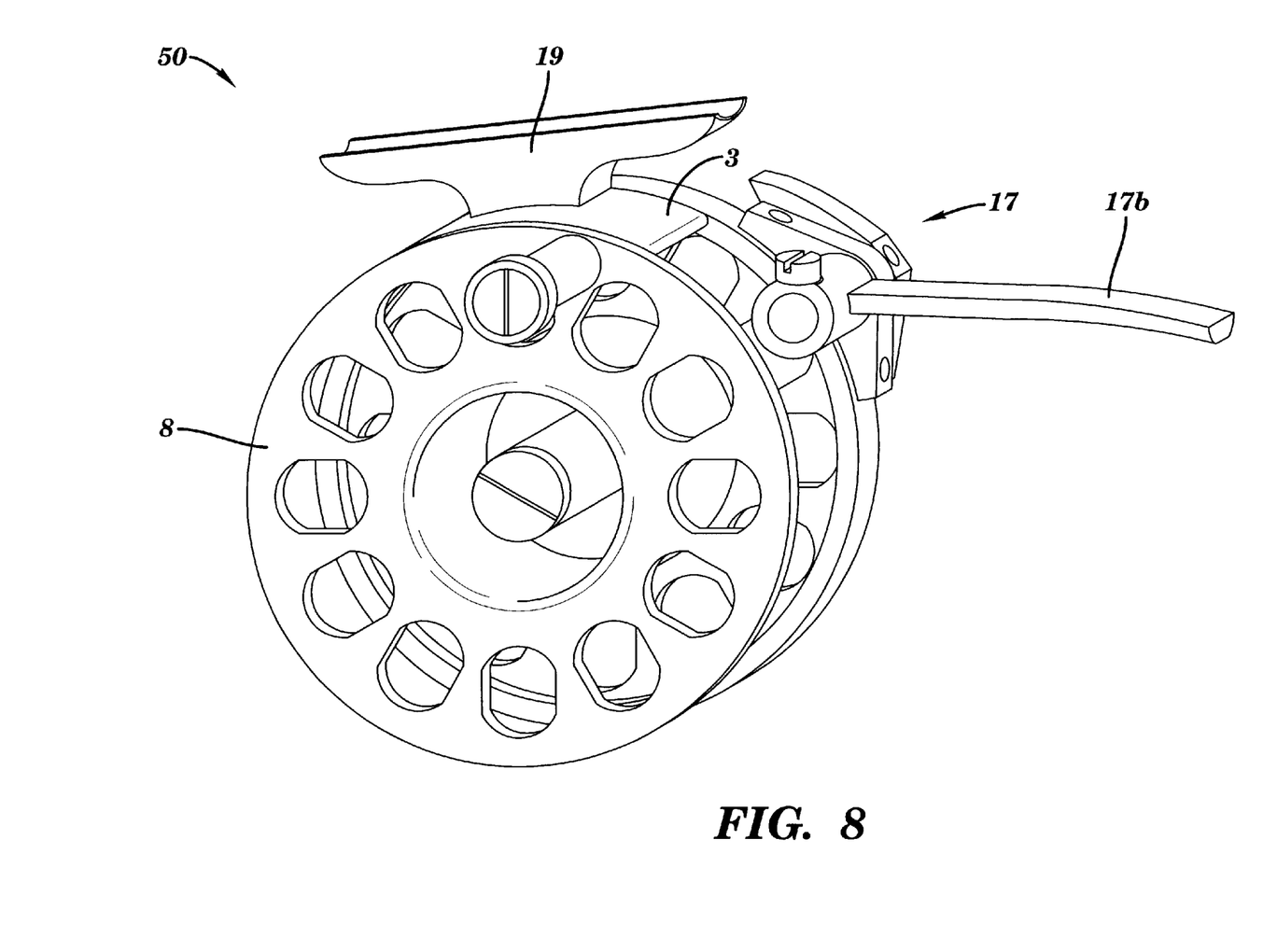
FIG. 8 depicts a first three dimensional view of the fly fishing reel of FIG. 7, illustrating the two piece trigger, in accordance with embodiments of the present invention.

FIG. 8 illustrates a 3 dimensional view of the fly fishing reel 50 of FIG. 7 having the two piece device 17 (i.e. 17a and 17b) to engage or release a preset amount of drag from a spool 8, in accordance with embodiments of the present invention. The device 17 may be a trigger (i.e., as shown in FIG. 8) or a lever (i.e., as shown in FIG. 6). The spool 8 is enclosed by a reel body 3. The reel body is mounted to a fishing pole using a reel foot 19. The device 17 may be engaged so that a preset amount of drag may be applied to the reel 8, gradually or instantaneously. The device 17 may comprise a metallic alloy or metal such as, inter alia, stainless steel or aluminum. The spool 8, reel foot 19 and reel body 3 may each comprise a metallic alloy or metal such as, inter alia, aluminum.

Figure 9:
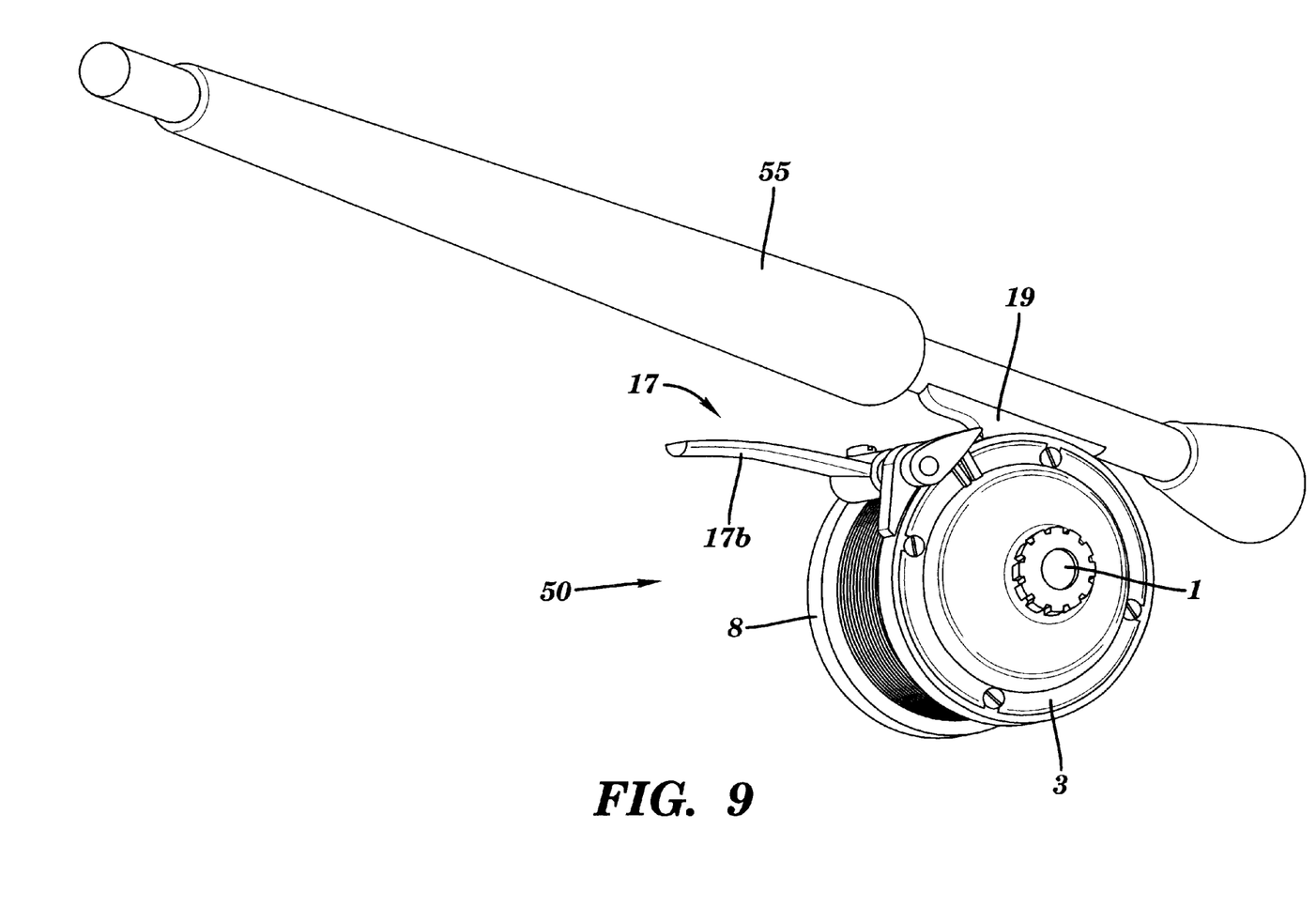
FIG. 9 depicts a second three dimensional view of the fly fishing reel of FIG. 7 with the fly fishing reel attached to a pole, in accordance with embodiments of the present invention.

FIG. 9 illustrates a second 3 dimensional view of a fly fishing reel 50 of FIG. 7 mounted on a fishing pole 55 having a device 17 to engage or release a preset amount of drag from a spool 8, in accordance with embodiments of the present invention. The device 17 may be a trigger (i.e., as shown in FIG. 9) or a lever (i.e., as shown in FIG. 6). The spool 8 is enclosed by a reel body 3. The reel body is mounted to the fishing pole 55 using a reel foot 19. The device 17 may be engaged so that a preset amount of drag may be applied to the reel 8, gradually or instantaneously. The preset amount of drag is set using a drag preset knob 1. The device 17 may comprise a metallic alloy or metal such as, inter alia, stainless steel or aluminum. The spool 8, reel foot 19 and reel body 3 may each comprise a metallic alloy or metal such as, inter alia, aluminum.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A fly-fishing reel, comprising:
    a spool of line on a spindle of the fly-fishing reel;
    a drag mechanism comprising a taper drag disc, wherein the taper drag disc and the spindle are coaxial on a first axis, and wherein the drag mechanism is adjustable to apply a preset resistance against rotation of the spool; and
    a device, wherein the device comprises a pivot point, wherein the pivot point lies on a second axis, wherein the first axis is displaced from the second axis, wherein the device is adapted to directly engage the taper drag disc such that a friction between the device and the taper drag disc creates the preset resistance against rotation of the spool, and wherein the device releases the drag mechanism from the spool such that the preset resistance is disabled.

2. The fly-fishing reel of claim 1, wherein the device enables the preset resistance after the preset resistance is disabled.

3. The fly-fishing reel of claim 1, wherein the spool is adapted to rotate in a clockwise direction.

4. The fly-fishing reel of claim 1, wherein the spool is adapted to rotate in a counter clockwise direction.

5. The fly-fishing reel of claim 1, wherein the device is a trigger.

6. The fly-fishing reel of claim 1, wherein the device is a lever.

7. The fly-fishing reel of claim 1, wherein the drag mechanism and the device are separate components.

8. The fly-fishing reel of claim 1, wherein the drag mechanism is adapted to apply the preset resistance gradually against rotation of the spool.

9. The fly-fishing reel of claim 1, wherein the drag mechanism is adapted to apply the preset resistance instantaneously against rotation of the spool.

10. The fly-fishing reel of claim 1, wherein the device includes a tapered drag surface.

11. The fly-fishing reel of claim 1, wherein the device comprises one piece.

12. The fly-fishing reel of claim 1, wherein the device comprises a plurality of pieces.

13. A fly-fishing reel, comprising:
    a spool of line on a spindle of the fly-fishing reel;
    a drag mechanism comprising a taper drag disc, wherein the taper drag disc and the spindle are coaxial on a first axis, and wherein the drag mechanism is adjustable to apply a preset resistance against rotation of the spool; and
    a device, wherein the device comprises a pivot point, wherein the pivot point lies on a second axis, wherein the first axis is displaced from the second axis, wherein the device is adapted to directly engage the taper drag disc such that a friction between the device and the taper drag disc creates the preset resistance against rotation of the spool, and wherein the device engages the drag mechanism to the spool such that the preset resistance is enabled.

14. The fly-fishing reel of claim 13, wherein the device disables the preset resistance after the preset resistance is enabled.

15. The fly-fishing reel of claim 13, wherein the spool is adapted to rotate in a clockwise direction.

16. The fly-fishing reel of claim 13, wherein the spool is adapted to rotate in a counter clockwise direction.

17. The fly-fishing reel of claim 13, wherein the device is a trigger.

18. The fly-fishing reel of claim 13, wherein the device is a lever.

19. The fly-fishing reel of claim 13, wherein the drag mechanism and the device are separate components.

20. The fly-fishing reel of claim 13, wherein the drag mechanism is adapted to apply the preset resistance gradually against rotation of the spool.

21. The fly-fishing reel of claim 13, wherein the drag mechanism is adapted to apply the preset resistance instantaneously against rotation of the spool.

22. The fly-fishing reel of claim 13, wherein the device includes a tapered drag surface.

23. The fly-fishing reel of claim 13, wherein the device comprises one piece.

24. The fly-fishing reel of claim 13, wherein the device comprises a plurality of pieces.

25. A method for forming a fly-fishing reel, comprising:

providing a spool of line on a spindle of the fly-fishing reel;

providing a drag mechanism comprising a taper drag disc, wherein the taper drag disc and the spindle are coaxial on a first axis, and wherein the drag mechanism is adjustable to apply a preset resistance against rotation of the spool; and providing a device, wherein the device comprises a pivot point, wherein the pivot point lies on a second axis, wherein the first axis is displaced from the second axis, wherein the device is adapted to directly engage the taper drag disc such that a friction between the device and the taper drag disc creates the preset resistance against rotation of the spool, and wherein the device releases the drag mechanism from the spool such that the preset resistance is disabled.

26. The method claim 25, wherein the device enables the preset resistance after the preset resistance is disabled.

27. The method of claim 25, wherein the spool is adapted to rotate in a clockwise direction.

28. The method of claim 25, wherein the spool is adapted to rotates in a counter clockwise direction.

29. The method of claim 25, wherein the device is a trigger.

30. The method of claim 25, wherein the device is a lever.

31. The method of claim 25, wherein the drag mechanism and the device are separate components.

32. The method of claim 25, wherein the drag mechanism is adapted to apply the preset resistance gradually against rotation of the spool.

33. The method of claim 25, wherein the drag mechanism is adapted to apply the preset resistance instantaneously against rotation of the spool.

34. The method of claim 25, wherein the device includes a tapered drag surface.

35. The method of claim 25, wherein the device comprises one piece.

36. The method of claim 25, wherein the device comprises a plurality of pieces.

37. A method for forming a fly-fishing reel, comprising:

providing a spool of line on a spindle of the fly-fishing reel;

providing a drag mechanism comprising a taper drag disc, wherein the taper drag disc and the spindle are coaxial on a first axis, and wherein the drag mechanism is adjustable to apply a preset resistance against rotation of the spool; and providing a device, wherein the device comprises a pivot point, wherein the point lies on a second axis, wherein the first axis is displaced from the second axis, wherein the device is adapted to directly engage the taper drag disc such that a friction between the device and the taper drag disc creates the preset resistance against rotation of the spool, and wherein the device engages the drag mechanism to the spool such that the preset resistance is enabled.

38. The method of claim 37, wherein the device disables the preset resistance after the preset resistance is enabled.

39. The method of claim 37, wherein the spool is adapted to rotate in a clockwise direction.

40. The method of claim 37, wherein the spool is adapted to rotate in a counter clockwise direction.

41. The method of claim 37, wherein the device is a trigger.

42. The method of claim 37, wherein the device is a lever.

43. The method of claim 37, wherein the drag mechanism and the device are separate components.

44. The method of claim 37, wherein the drag mechanism is adapted to apply the preset resistance gradually against rotation of the spool.

45. The method of claim 37, wherein the drag mechanism is adapted to apply the preset resistance instantaneously against rotation of the spool.

46. The method of claim 37, wherein the device includes a tapered drag surface.

47. The method of claim 37, wherein the device comprises one piece.

48. The method of claim 37, wherein the device comprises a plurality of pieces.

\* \* \* \* \*